United States Patent
Gagas et al.

(10) Patent No.: US 10,396,696 B1
(45) Date of Patent: Aug. 27, 2019

(54) METHODS, SYSTEMS AND APPARATUS FOR CONTROLLING CURRENT SUPPLIED TO CONTROL A MACHINE

(71) Applicant: GM GLOBAL TECHNOLOGY OPERATIONS LLC, Detroit, MI (US)

(72) Inventors: Brent S. Gagas, Ferndale, MI (US); Dwarakanath V. Simili, Oakland Township, MI (US); Caleb W. Secrest, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/900,828

(22) Filed: Feb. 21, 2018

(51) Int. Cl.
| | |
|---|---|
| *H02P 21/00* | (2016.01) |
| *H02P 21/22* | (2016.01) |
| *H02P 27/08* | (2006.01) |
| *B60L 50/51* | (2019.01) |

(52) U.S. Cl.
CPC .............. *H02P 21/22* (2016.02); *H02P 27/08* (2013.01); *B60L 50/51* (2019.02)

(58) Field of Classification Search
CPC ................................. H02P 21/22; H02P 27/08
USPC ..................................................... 318/400.02
See application file for complete search history.

(56) References Cited

U.S. PATENT DOCUMENTS 7,843,162 B2  11/2010  Bae et al.

*Primary Examiner* — Erick D Glass
(74) *Attorney, Agent, or Firm* — Lorenz & Kopf LLP

(57) ABSTRACT

A current regulator is provided for an electric machine drive system for driving an electric machine. The current regulator includes an adjustable damping module that has a value of virtual damping resistance that is applied at the current regulator. The value of virtual damping resistance is adjustable as a function of sampling frequency. A controller can control the current regulator by determining whether the sampling frequency has changed since a previous execution cycle of the current regulator, and when the sampling frequency has changed since the previous execution cycle, the controller can modify the damping value as a function of the sampling frequency to allow the damping value to change with the sampling frequency. The damping value has a new value of virtual damping resistance that is applied at the current regulator after modifying the damping value. The controller can then execute the current regulator in accordance with the modified damping value to generate the voltage commands.

17 Claims, 10 Drawing Sheets

METHODS, SYSTEMS AND APPARATUS FOR CONTROLLING CURRENT SUPPLIED TO CONTROL A MACHINE

TECHNICAL FIELD

The present disclosure generally relates to techniques for controlling operation of multi-phase systems that include alternating current (AC) machines, and more particularly relate to methods, systems and apparatus for controlling current supplied to control an electric machine.

INTRODUCTION

Electric machines are utilized in a wide variety of applications. For example, hybrid/electric vehicles (HEVs) typically include an electric traction drive system that includes a multi-phase alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. For instance, some traditional HEVs implement two three-phase pulse width modulated (PWM) inverter modules and two three-phase AC machines (e.g., AC motors) each being driven by a corresponding one of the three-phase PWM inverter modules that it is coupled to.

In such multi-phase systems, synchronous frame current regulators are commonly used for current control of AC motors, such as three-phase electric motors. By providing dynamic control over a wide frequency range, synchronous frame current regulators are suited to many industrial applications. In digital implementations of conventional current regulators, as the ratio of the sampling frequency to the fundamental frequency, or synchronous frequency, of the AC motor decreases, the stability of these current regulators tends to decrease. For example, delays in digital implementation, increased sub-harmonics in voltage synthesis using pulse width modulation (PWM), or the like, tend to introduce instability. To produce high torque within a limited volume, a high pole-count electric motor is useful, particularly for hybrid vehicle applications (e.g., hybrid electric vehicles or the like). An increased pole-count generally increases the fundamental frequency associated with the AC motor, while the switching and sampling frequency associated with the current regulation is generally limited due to limitations of the switching power device and the throughput of the processor. Typically, at maximum speed, the ratio of sampling frequency to fundamental frequency, $f_{samp}/f_{fund}$, can be very small (e.g., smaller than a ratio of about ten (10)). When this ratio is less than about ten (10), a discrete time domain controller may have a sufficiently pronounced influence on the synchronous frame current regulator. Furthermore, inner current loops associated with the current regulator may incur instability due to digital delays. Sub-harmonics associated with asynchronous PWM become significant when the ratio is lower than about twenty-one (21).

Some current regulators perform better under certain operating conditions, while others perform better under other operating conditions. Some current regulators implement a virtual damping resistance to reduce parameter sensitivity and increase the disturbance rejection of the system, often described as increasing the stiffness of the drive system. In such current regulators, the virtual damping resistance is set to a constant value. One drawback of this approach is that the maximum achievable virtual damping resistance is limited to an extent by a minimum sampling frequency condition observed by the current regulator.

Accordingly, it is desirable to provide methods and systems for controlling an AC motor that stabilize current regulation over a wide range of motor operating conditions. It would also be desirable to provide current regulator architectures that can be modified during different operating conditions so that the current regulator topology being used performs well under the present operating condition. Additionally, it would be desirable to provide methods and systems for current regulation of an AC motor that can operate as sampling frequency varies. Furthermore, other desirable features and characteristics of the present invention will become apparent from the subsequent detailed description and the appended claims, taken in conjunction with the accompanying drawings and the foregoing technical field and background.

SUMMARY

In accordance with some of the disclosed embodiments, a current regulator is provided for an electric machine drive system for driving an electric machine. The current regulator includes an adjustable damping module that has a value of virtual damping resistance that is applied at the current regulator. The value of virtual damping resistance is adjustable as a function of sampling frequency. A controller can control the current regulator by determining whether the sampling frequency has changed since a previous execution cycle of the current regulator, and when the sampling frequency has changed since the previous execution cycle, the controller can modify the damping value as a function of the sampling frequency to allow the damping value to change with the sampling frequency. The damping value has a new value of virtual damping resistance that is applied at the current regulator after modifying the damping value. The controller can then execute the current regulator in accordance with the modified damping value to generate the voltage commands.

In one embodiment, the controller can store a previous damping value that is a previous value of the virtual damping resistance applied during the previous execution cycle of the current regulator, determine the modified damping value based on the sampling frequency during a current execution cycle of the current regulator, and compute a change in damping value based on the difference between the modified damping value and the previous damping value. The modified damping value is a new value of virtual damping resistance based on a new sample frequency, and the change in the damping value is a change in the virtual damping resistance based on a difference between the new value of virtual damping resistance and the previous value of virtual damping resistance.

In one embodiment, the current regulator includes integrators, and the controller can reinitialize, prior to executing the current regulator, integration terms generated by the integrators of the current regulator when the virtual damping resistance is updated. In one embodiment, the current regulator can generate current error values and apply gains to the current error values prior to providing the current error values to the integrators that generate integration terms. Each current error value is determined based on a difference between a current command value and a stator current value from the electric machine. In one embodiment, the current regulator can generate voltage commands for the current execution cycle based on the modified damping value and updated values of integration terms generated by the integrators by setting each to presently determined values.

In one embodiment, the electric machine and the electric machine drive system including the current regulator can be implemented within a vehicle.

In one embodiment, the controller can perform a method to control the current regulator. In accordance with the method, the controller can determine whether a sampling frequency has changed since a previous execution cycle of the current regulator. When the sampling frequency has changed since the previous execution cycle, the controller can modify a damping value of the current regulator as a function of sampling frequency to allow the damping value to change with the sampling frequency such that the damping value has a new value of virtual damping resistance that is applied at the current regulator after modifying. The controller can then execute the current regulator to generate the voltage commands in accordance with the modified damping value. The controller can modify the damping value of the current regulator by updating and setting the damping value as a function of the sampling frequency. For instance, in one embodiment, the controller can compute the new value of virtual damping resistance using an equation, and in another embodiment, the controller can determine the new value of virtual damping resistance via a lookup table.

In one embodiment, the controller can store a previous damping value that is a previous value of the virtual damping resistance applied during the previous execution cycle of the current regulator; determine the modified damping value based on the sampling frequency during a current execution cycle of the current regulator; and compute a change in damping value based on the difference between the modified damping value and the previous damping value. The modified damping value is a new value of virtual damping resistance based on a new sample frequency, and the change in the damping value is a change in the virtual damping resistance based on a difference between the new value of virtual damping resistance and the previous value of virtual damping resistance.

In one embodiment, the current regulator can generate current error values, and apply gains to the current error values prior to providing the current error values to integrators of the current regulator. Each current error value is determined based on a difference between a current command value and a stator current value from the electric machine. In one embodiment, prior to executing the current regulator during a current execution cycle of the current regulator, the controller can reinitialize integration terms generated by integrators of the current regulator when the virtual damping resistance is updated. For example, the controller can reinitialize integration terms generated by integrators during a transition period to avoid inducing disturbance voltages as when a previous damping value is being updated to the modified damping value. In one embodiment, the controller can execute the current regulator using the modified damping value and updated values of the integration terms generated by the integrators by setting each to presently determined values to generate voltage commands for the current execution cycle of the current regulator.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
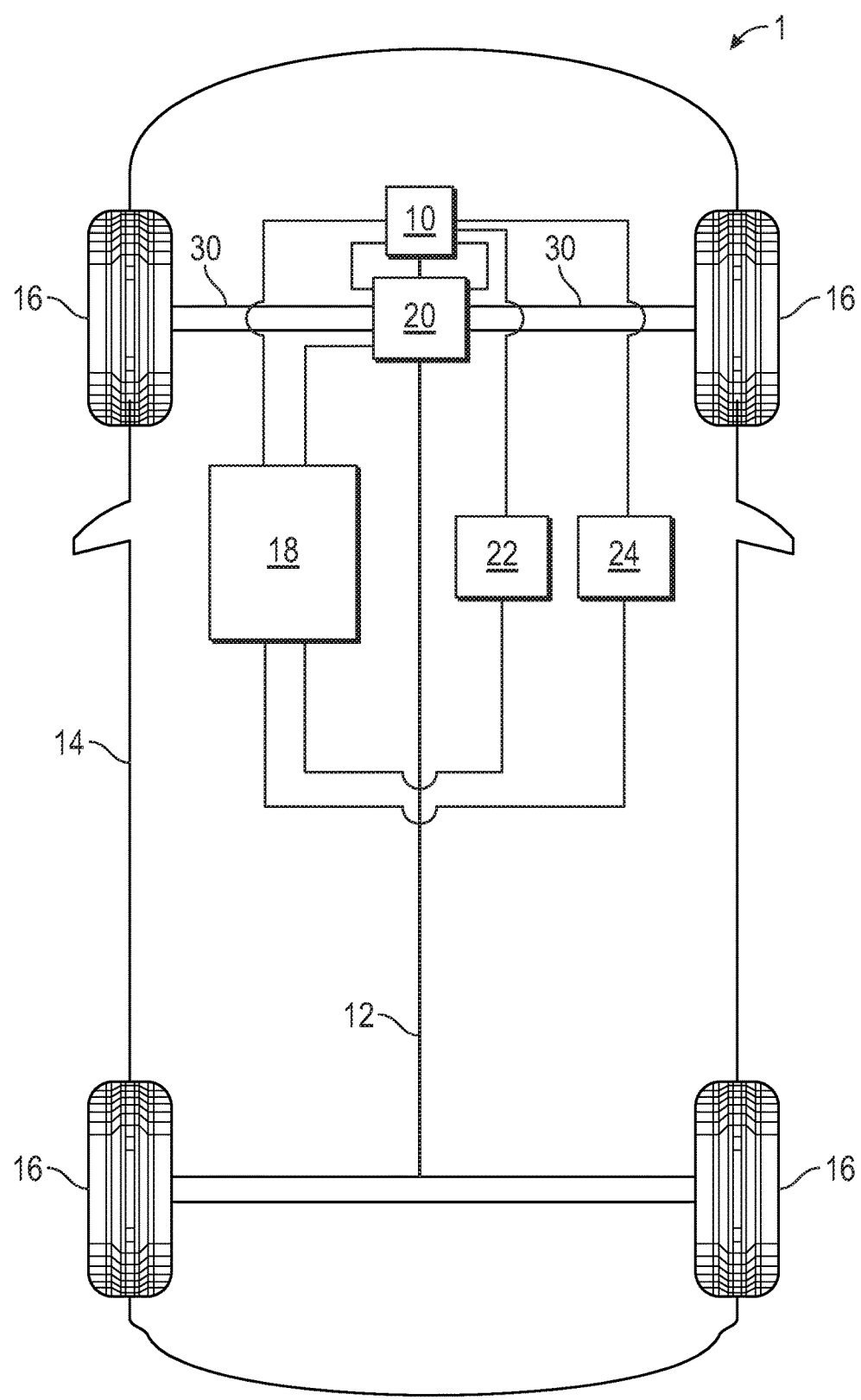
FIG. 1 illustrates one non-limiting example, of a vehicle in which the disclosed embodiments may be implemented.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Some current regulators perform better under certain operating conditions, while others perform better under other operating conditions. For example, a state feedback decoupling (SFbD) performs well under high acceleration conditions (e.g., vehicle shudder, driveline-resonance, wheel slip conditions) and when considering the effects of discrete control. By contrast, a complex vector current regulator (CVCR) performs well when operating under low and moderate acceleration conditions, but over a very wide speed range, including high speeds with overmodulation and six-step control operating conditions. The disclosed embodiments provide a current regulator architecture that can be varied to allow for multiple different current regulator topologies to be used based on operating conditions where a particular current regulator topology performs best. The disclosed embodiments can allow for the appropriate current regulator configuration to be selected based on speed (e.g., motor speed or electrical fundamental frequency), and then instantaneously, and smoothly, transition between the state feedback decoupling (SFbD) current regulator configuration and the complex vector current regulator configuration at set speed breakpoints. The disclosed embodiments can utilize each current regulator configuration where it is most advantageous to improve current control during high-acceleration conditions without degrading performance in the overmodulation and six-step operating regions.

In one embodiment, a current regulator is provided for an electric machine drive system for driving an electric machine. The current regulator is configurable to operate in a first configuration or a second configuration depending on a synchronous speed of the electric machine (or other machine or drive states). A controller can configure an operational mode of the current regulator by selecting, based on the synchronous speed of the electric machine, either the first configuration of the current regulator or the second configuration of the current regulator as a currently active configuration, and can then execute the current regulator in accordance with the currently active configuration. The first configuration of the current regulator comprises a first set of elements and cross-coupling gain blocks, whereas the second configuration of the current regulator can include the first set of elements without the cross-coupling gain blocks. The first set elements can vary depending on the implementation, but can generally include: summing junctions, integrators, and gain blocks. In one embodiment, the current regulator is configured to operate as a complex vector current regulator when configured in the first configuration, and is configured to operate as a state feedback decoupling (SFbD) current regulator when configured in the second configuration.

Embodiments of the present invention relate to methods, systems and apparatus for controlling operation of a multi-phase system that can be implemented, for example, in operating environments such as a hybrid/electric vehicle (HEV). Embodiments of the present invention relate to methods, systems and apparatus for current regulators. In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Although an AC machine can be an AC motor (e.g., apparatus used to convert AC electrical energy or power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field.

FIG. 1 illustrates one non-limiting example, of a vehicle, or automobile 1, in which the disclosed embodiments may be implemented. The automobile 1 includes a driveshaft 12, a body 14, four wheels 16, and an electronic control system 18. The body 14 is arranged on the chassis and substantially encloses the other components of the automobile 1. The body 14 and the chassis may jointly form a frame. The wheels 16 are each rotationally coupled to the chassis near a respective corner of the body 14.

The automobile 1 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 1 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 1 further includes a motor 20 (i.e., an electric motor/generator, traction motor, etc.), energy sources 22, 24, and a power inverter assembly 10. As shown in FIG. 1, the motor 20 may also include a transmission integrated therein such that the motor 20 and the transmission are mechanically coupled to at least some of the wheels 16 through one or more half shafts 30.

As shown, the energy source 22, 24 are in operable communication and/or electrically coupled to the electronic control system 18 and the power inverter assembly 10. Although not illustrated, the energy sources 22, 24 may vary depending on the embodiment and may be of the same or different type. In one or more embodiments, the energy sources 22, 24 may each comprise a battery, a fuel cell, an ultracapacitor, or another suitable voltage source. A battery may be any type of battery suitable for use in a desired application, such as a lead acid battery, a lithium-ion battery, a nickel-metal battery, or another rechargeable battery. An ultracapacitor may comprise a supercapacitor, an electrochemical double layer capacitor, or any other electrochemical capacitor with high energy density suitable for a desired application.

The motor 20 can be a multi-phase alternating current (AC) motor and includes windings, where each winding corresponds to one phase of the motor 20, as will be described in greater detail below. Although not illustrated, the motor 20 can include a stator assembly (including the coils), a rotor assembly (e.g., including a ferromagnetic core), and a cooling fluid (i.e., coolant), as will be appreciated by one skilled in the art. The motor 20 may be an induction motor, a permanent magnet motor, a synchronous reluctance motor, or any type suitable for the desired application.

Figure 2:
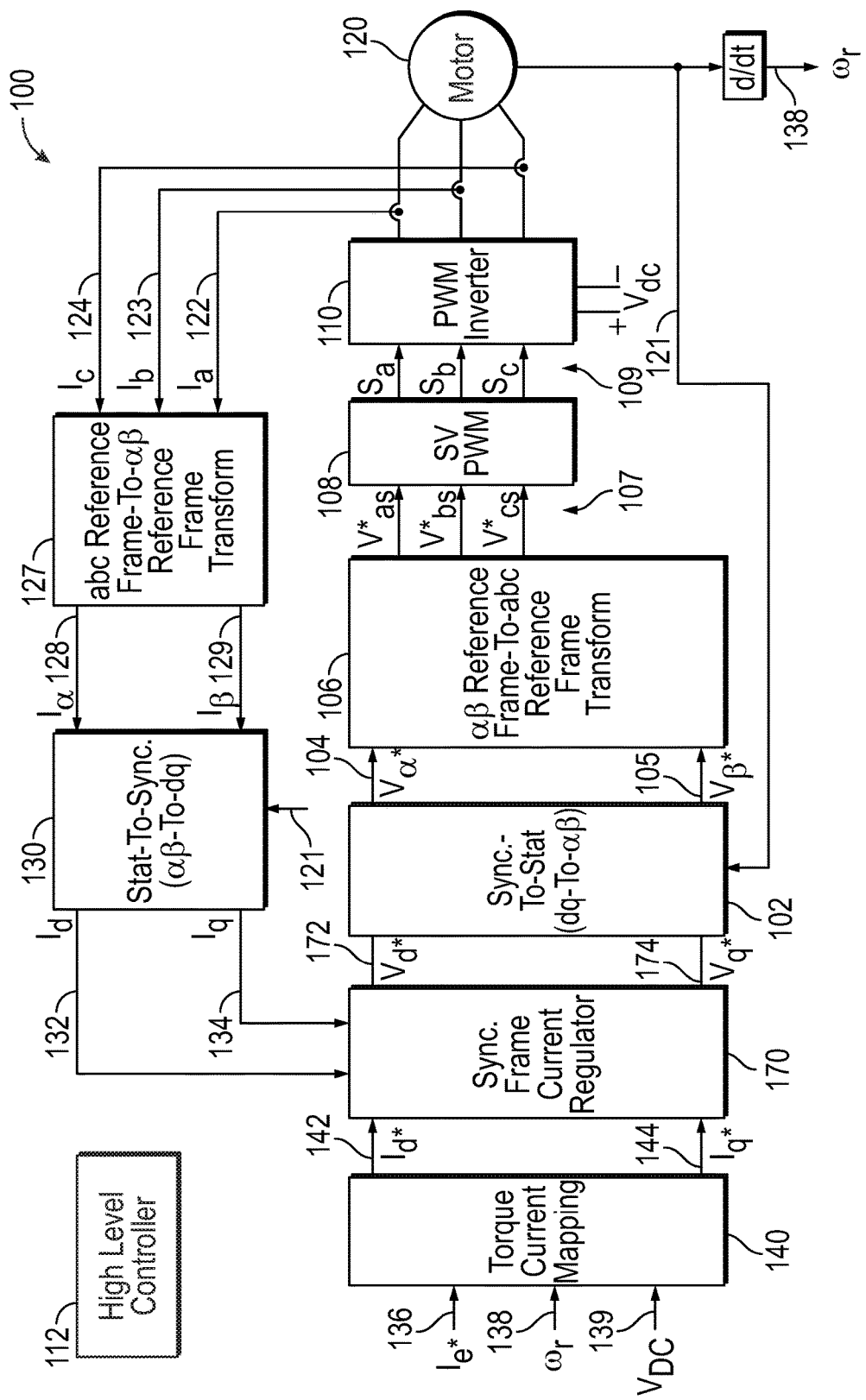
FIG. 2 is a block diagram of one example of a vector controlled motor drive system in accordance with various embodiments.

FIG. 2 is a block diagram of one example of a vector controlled motor drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) provided to the three-phase PWM inverter module 110 by adjusting current commands that control the three-phase AC machine 120. The three-phase AC machine 120 can be used as the motor 20 of FIG. 1. In one particular implementation, the vector controlled motor drive system 100 can be used to control torque in an HEV.

In the following description of one particular non-limiting implementation, the three-phase AC machine 120 is described as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes fewer or more phases.

The three-phase AC motor 120 is coupled to the three-phase PWM inverter module 110 via three inverter poles and generates mechanical power (Torque×Speed) based on three-phase sinusoidal current signals received from the PWM inverter module 110. In some implementations, the angular position of a rotor (θr) of the three-phase AC motor 120 or "shaft position" is measured using a position sensor (not illustrated), and in other implementations, the angular position of a rotor (θr) of the three-phase AC motor 120 can be estimated without using a position sensor by using sensorless position estimation techniques.

Figure 3:
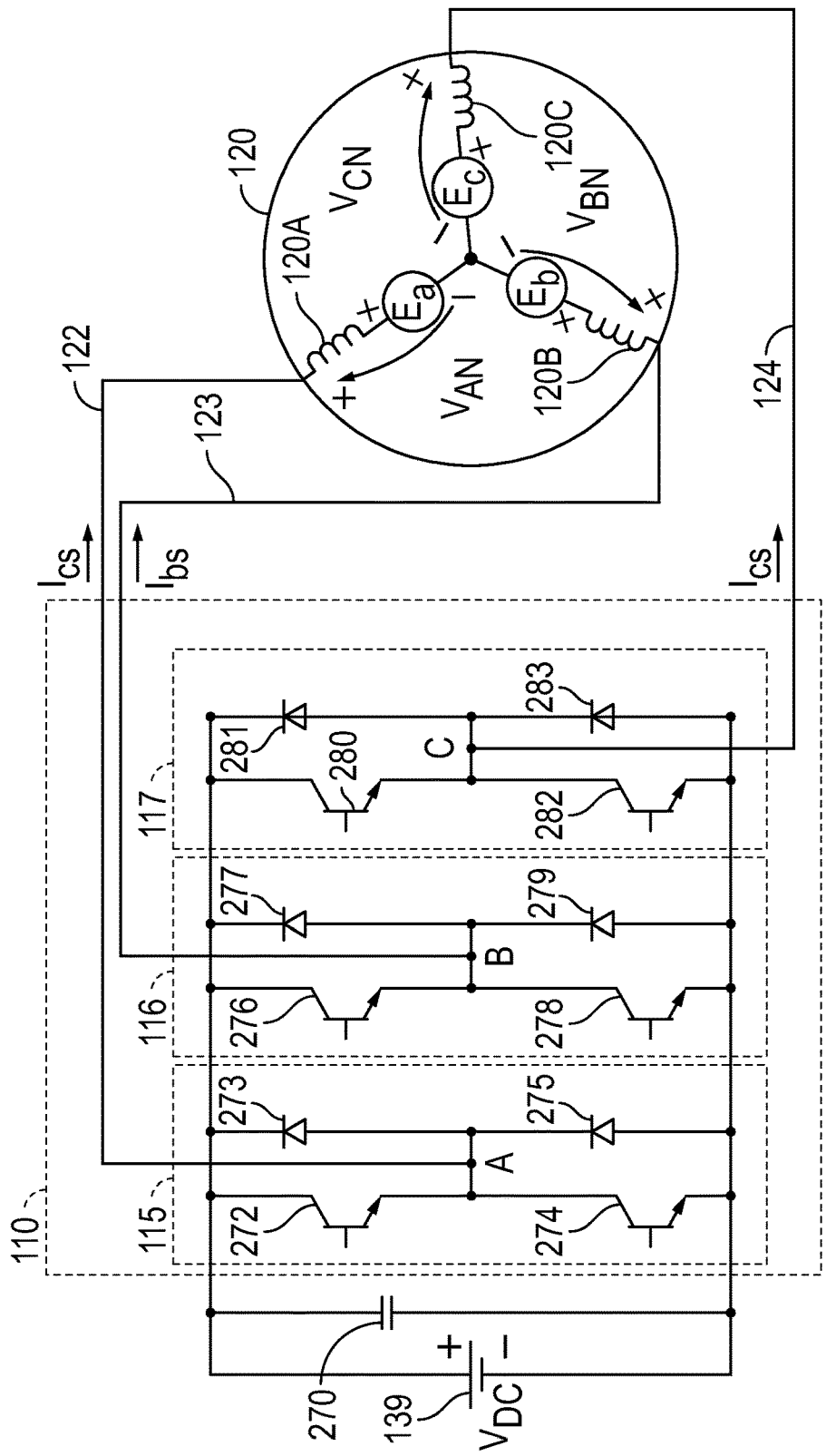
FIG. 3 is a block diagram of a portion of a motor drive system including a three-phase voltage source inverter module connected to a three-phase AC motor.

Prior to describing operation details of the system 100, a more detailed description of one exemplary implementation of the three-phase voltage source inverter 110 will be provided (including how it is connected to the three-phase AC motor 120) with reference to FIG. 3.

FIG. 3 is a block diagram of a portion of a motor drive system including a three-phase voltage source inverter 110 connected to a three-phase AC motor 120. It should be noted that the three-phase voltage source inverter 110 and the three-phase motor 120 in FIG. 2 are not limited to this implementation; rather, FIG. 3 is merely one example of how the three-phase voltage source inverter 110 and the three-phase motor 120 in FIG. 2 could be implemented in one particular embodiment.

As illustrated in FIG. 3, the three-phase AC motor 120 has three stator or motor windings 120a, 120b, 120c, connected to motor terminals A, B, C, and the three-phase PWM inverter module 110 includes a capacitor 270 and three inverter sub-modules 115-117. In this particular embodiment, in phase A the inverter sub-module 115 is coupled to motor winding 120a, in phase B the inverter sub-module 116 is coupled to motor winding 120b, and in phase C the inverter sub-module 117 is coupled to motor winding 120c. The current flow is bi-directional into and out of all motor windings 120.

The resultant phase or stator currents (Ias-Ics) 122, 123, 124, flow through respective stator windings 120a-c. The phase to neutral voltages across each of the stator windings 120a-120c are respectively designated as $V_{AN}$, $V_{BN}$, $V_{CN}$, with the back electromotive force (EMF) voltages generated in each of the stator windings 120a-120c respectively shown as the voltages $E_a$, $E_b$, $E_c$, produced by ideal voltage sources, each respectively shown connected in series with stator windings 120a-120c. As is well known, these back-EMF voltages $E_a$, $E_b$, $E_c$, are the voltages induced in the respective stator windings 120a-120c by the rotation of the rotor magnetic field. Although not shown, the motor 120 is coupled to a drive shaft.

The inverter 110 includes a capacitor 270, a first inverter sub-module 115 comprising a dual switch 272/273, 274/275, a second inverter sub-module 116 comprising a dual switch 276/277, 278/279, and a third inverter sub-module 117 comprising a dual switch 280/281, 282/283. As such, inverter 110 has six solid state controllable switching devices 272, 274, 276, 278, 280, 282, and six diodes 273, 275, 277, 279, 281, 283, to appropriately switch DC voltage ($V_{DC}$) and provide three-phase energization of the stator windings 120a, 120b, 120c of the three-phase AC motor 120.

A high-level motor controller 112 can receive motor command signals and motor operating signals from the motor 120, and generate control signals for controlling the switching of solid state switching devices 272, 274, 276, 278, 280, 282 within the inverter sub-modules 115-117. By providing appropriate control signals to the individual inverter sub-modules 115-117, the controller 112 controls switching of solid state switching devices 272, 274, 276, 278, 280, 282, within the inverter sub-modules 115-117 and thereby controls the outputs of the inverter sub-modules 115-117 that are provided to motor windings 120a-120c, respectively. The resultant stator currents (Ias . . . Ics) 122-124 that are generated by the inverter sub-modules 115-117 of the three-phase inverter module 110 are provided to motor windings 120a, 120b, 120c. The voltages as $V_{AN}$, $V_{BN}$, $V_{CN}$, and the voltage at node N fluctuate over time depending on the open/close states of switches 272, 274, 276, 278, 280, 282 in the inverter sub-modules 115-117 of the inverter module 110, as will be described below.

Referring again to FIG. 2, the vector control motor drive system 100 includes a torque-to-current mapping module 140, a synchronous (SYNC.) frame current regulator module 170, a synchronous-to-stationary (SYNC.-TO-STAT.) transformation module 102, an αβ reference frame-to-abc reference frame (αβ-to-abc) transformation module 106, a pulse width modulation (PWM) module 108, a three-phase PWM inverter 110, an abc reference frame-to-αβ reference frame (abc-to-αβ) transformation module 127, and a stationary-to-synchronous (STAT.-TO-SYNC.) transformation module 130.

The torque-to-current mapping module 140 receives a torque command signal (Te*) 136, angular rotation speed (ωr) 138 of the shaft that is generated based on the derivative of the rotor/shaft position output (θr) 121, and the DC input voltage ($V_{DC}$) 139 as inputs, along with possibly a variety of other system parameters depending upon implementation.

The torque-to-current mapping module 140 uses these inputs to generate a d-axis current command (Id*) 142 and a q-axis current command (Iq*) 144 that will cause the motor 120 to generate the commanded torque (Te*) at motor speed (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time during steady-state operation.

Blocks 127, 130 collectively make up a reverse transformation module that can transform AC signals (e.g., the three-phase sinusoidal stator currents) into DC Cartesian signals (e.g., a d-axis synchronous frame stator current and a q-axis synchronous frame stator current) for use by the current regulator 170. In one embodiment, a detector (not shown) may be coupled to the AC motor 120 to sample the AC signals and supply these and other measured quantities (e.g., from a variety of system outputs) to the current regulator 170 (and other high-level controllers). For example, the detector may measure a supply potential (e.g., a battery potential or DC bus voltage ($V_{dc}$)), the phase or stator currents, a motor speed (ωr) 138 of the AC motor 120, a rotor phase angle (θr) 121 of the AC motor 120, or the like.

In one embodiment, the abc-to-αβ transformation module 127 receives the measured three-phase stationary reference frame feedback stator currents (Ias . . . Ics) 122-124 that are fedback from motor 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation is well-known in the art and for sake of brevity will not be described in detail. The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The high-level controller 112 executes one or more programs (e.g., to optimize commanded currents for a predetermined control parameter, or the like) to determine operating inputs (e.g., modified commanded currents, commanded voltages, torque commands, or the like) used for controlling the AC motor 120 via the current regulator 170. In addition, the high-level controller can execute logic to control the current regulator 170 as will be described below in detailed with reference to FIGS. 4A through 9.

One or more of the components of the controller 112 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components, or a combination thereof. In one embodiment, the controller 112 is partitioned into one or more processing modules that are associated with one or more of the controller operations. For example, the current regulator 170 may be implemented as one of these processing modules. Although not shown, the controller 112 may include additional modules, such as a commanded current source, a torque module, a field-weakening voltage control module, an overmodulation module or the like. Additionally, one or more of the various processing modules of the controller 112, as well as one or more of the operations of the controller 112, may be embodied as separate components of the drive system 100 or incorporated with another component of the drive system 100.

Generally, the current regulator 170 produces commanded voltages and supplies the commanded voltages to the inverter 110 through blocks 102, 106, 108, which collectively make up a transformation module. The current regulator 170 produces direct current (DC) Cartesian commanded voltages (e.g., a d-axis synchronous frame commanded voltage and a q-axis synchronous frame commanded voltage) in steady-state. The transformation module 102, 106, 108 converts the DC Cartesian commanded voltages to three-phase AC commanded voltages (e.g., a first phase commanded voltage ($v_{as}*$), a second phase commanded voltage ($v_{bs}*$), and a third phase commanded voltage ($v_{cs}*$)) and supplies the three-phase AC commanded voltages to the inverter 110.

In one embodiment, to produce the d- and q-axis commanded voltages 172, 174, the current regulator 170 utilizes several inputs. For example, the current regulator 170 can use current signals 132, 134 (d-axis and q-axis synchronous frame stator currents), the commanded currents 142, 144, and decoupling voltages (not shown in FIG. 2) provided by the controller 112 to produce the d- and q-axis commanded voltages 172, 174. For example, the controller 112 may retrieve the commanded currents from a commanded current table 140 that can be stored in a memory of the controller 112. The commanded current table is preferably optimized for one or more pre-determined control parameters (e.g., system efficiency) and may be derived from any number of models for optimizing the desired control parameter(s). Additionally, the commanded current table may be pre-determined based on voltage and current limits of the AC motor 120 such that the commanded current source applies an appropriate amount of d-axis and q-axis currents to the AC motor 120 to produce a desired torque (e.g., with high efficiency) and maintain current regulation stability. The inverter voltage limits may be pre-determined based on the supply voltage or calculated online, and the feedforward terms may be determined by the controller 112 based on the d-axis and q-axis synchronous frame stator currents, the motor speed, and the motor parameters.

In this embodiment, the synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are commands that have a constant value as a function of time when in steady state operation. The synchronous frame current regulator module 170 outputs the synchronous reference frame d-axis voltage command signal (Vd*) 172 and the synchronous reference frame q-axis voltage command signal (Vq*) 174. Further detail regarding operation of the synchronous frame current regulator module 170 and the process of current to voltage conversion will be described in greater detail below with reference to FIGS. 4A through 9. Because the current commands are DC signals in the synchronous reference frame during steady-state they are easier to regulate in comparison to AC stationary reference frame current commands.

The synchronous-to-stationary transformation module 102 receives the voltage command signals (Vd*, Vq*) 172, 174 as inputs along with the rotor position output (θr) 121. In response to the voltage command signals (Vd*, Vq*) 172, 174 and the measured (or estimated) rotor position angle (θr) 121, the synchronous-to-stationary transformation module 102 performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time in steady state. The process of synchronous-to-stationary conversion is well-known in the art and for sake of brevity will not be described in detail.

The αβ-to-abc transformation module 106 receives the stationary reference frame voltage command signals (Vα*, Vβ*) 104, 105, and based on these signals, generates stationary reference frame voltage command signals (Vas* . . . Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of pulse width modulation (PWM) of the phase voltage command signals (Vas* . . . Vcs*) 107. The switching vector signals (Sa . . . Sc) 109 are generated based on duty cycle waveforms that are not illustrated in FIG. 2, but are instead internally generated at the PWM module 108 to have a particular duty cycle during each PWM period. The PWM module 108 utilizes the phase voltage command signals (Vas* . . . Vcs*) 107 to calculate the duty cycle waveforms (not illustrated in FIG. 2) to generate switching vector signals (Sa . . . Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 based on the DC input 139.

The switching vector signals (Sa . . . Sc) 109 control the switching states of switches in PWM inverter 110 to generate the commanded three-phase voltage at each phase A, B, C. The switching vector signals (Sa . . . Sc) 109 are PWM waveforms that have a particular duty cycle during each PWM period that is determined by the duty cycle waveforms that are internally generated at the PWM module 108.

The inverter 110 (e.g., a pulse width modulation (PWM) voltage source inverter (VSI)) is coupled to the machine 120. In response to the commanded voltages and a supply potential ($V_{dc}$), the inverter 110 produces AC voltages which are used to drive the AC motor 120. As a result, stator currents are generated in the windings of the AC motor 120. The inverter 110 can also vary the amount of AC voltage applied to the AC motor 120 (e.g., the inverter 110 can vary the voltage using PWM), thus allowing the controller 12 to control the AC motor current. For example, the amount of voltage that the inverter 110 applies to the AC motor 120 may be indicated by a modulation index, and the PWM may be established between pre-determined modulation index limits. In one embodiment, synchronous PWM is utilized to vary the amount of AC voltage applied to the AC motor 120, although other PWM techniques may also be used.

The three-phase PWM inverter module 110 receives the DC input voltage (Vdc) and switching vector signals (Sa . . . Sc) 109, and uses them to generate three-phase alternating current (AC) voltage signal waveforms at inverter poles that drive the three-phase AC machine 120 at varying speeds ($\omega$r). The three-phase machine 120 receives the three-phase voltage signals generated by the PWM inverter 110 and generates a motor output at the commanded torque Te* 136. In this particular implementation, the machine 120 comprises a three-phase interior permanent-magnet synchronous motor (IPMSM) 120, but the disclosed embodiments can be any multi-phase AC machine having any number of phases.

Although not illustrated in FIG. 2, the system 100 may also include a gear coupled to and driven by a shaft of the three-phase AC machine 120. The measured feedback stator currents (Ia-Ic) 122-124 are sensed, sampled and provided to the abc-to-$\alpha\beta$ transformation module 127 as described above.

Current Regulator Module

In accordance with the disclosed embodiments, methods are provided for instantaneously and smoothly transitioning between current regulator topologies as a function of motor speed in this example, but could be based on other equivalent motor states, such as electrical fundamental frequency, inverter switching frequency or motor acceleration. For example, in one embodiment, a method is provided for instantaneously and smoothly transitioning between a State Feedback Decoupling (SFbD) current regulator and a Complex Vector Current Regulator (CVCR) as a function of motor speed. The method utilizes each type of current regulator during the operating conditions where it is most advantageous and where it performs best. For example, SFbD current regulator performs well under high acceleration conditions (e.g., vehicle shudder, driveline-resonance, wheel slip conditions) and when considering the effects of discrete control. The CVCR performs well in lower acceleration conditions, and over a wider range of speed including the overmodulation and six-step control regions. The method can select, based on motor speed, which type of current regulator should be active and transition between the different types of current regulators (e.g., at set speed breakpoints). The disclosed embodiments can allow each current regulator topology to be used in the operating space where it performs best to improve current control during high-acceleration conditions without degrading performance in the overmodulation and six-step operating regions. Improved current control can improve vehicle drive, as exhibited, for example, by noise, vibration or harshness (NVH) (e.g., eliminate or reduce vehicle low-speed shudder) when using the SFbD current regulator, and there is no negative impact on overmodulation and six-step control by maintaining use of CVCR at higher speeds.

Figure 4A:
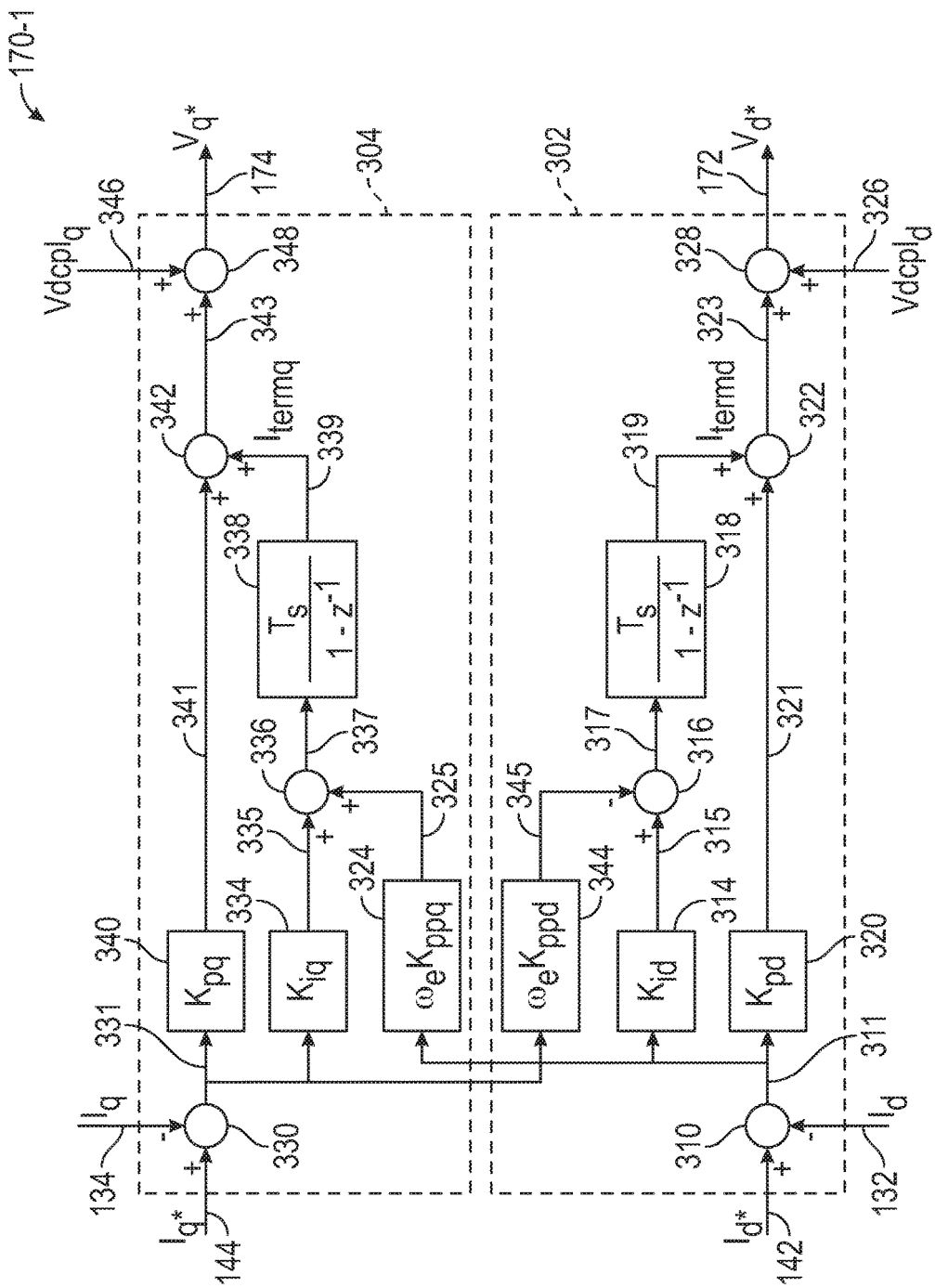
FIGS. 4A and 4B are block diagrams of a current regulator in accordance with one implementation of the disclosed embodiments.
Figure 4B:
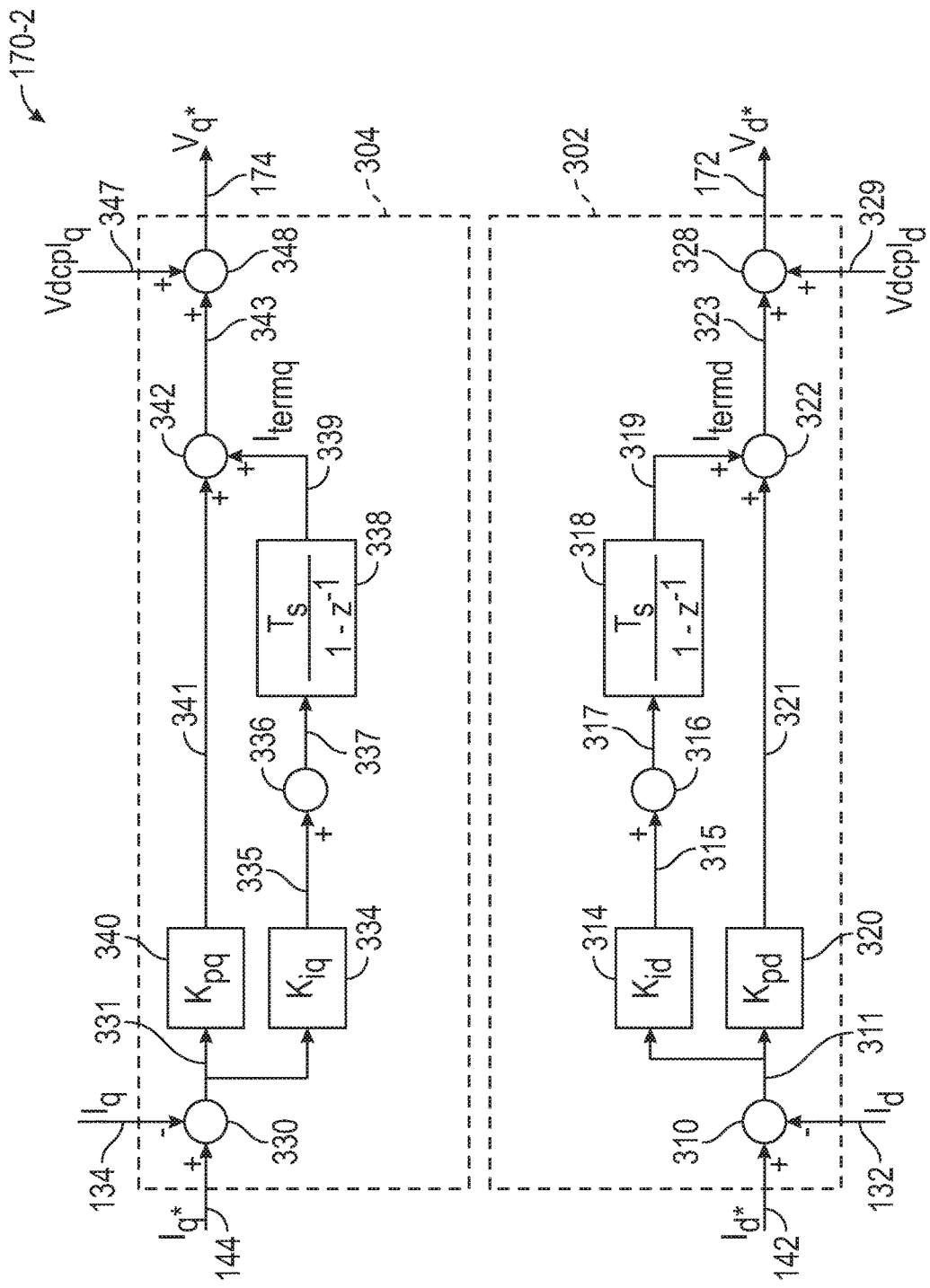

FIGS. 4A and 4B are block diagrams of a current regulator module 170 in accordance with one implementation of the disclosed embodiments. The current regulator module 170 includes various blocks shown in FIG. 4A. When all blocks are enabled, the current regulator module 170 functions as a complex vector (CV) current regulator module 170-1. By contrast, when certain blocks 324, 344 are disabled (e.g., when gains Kppd, Kppq are set to zero), as shown in FIG. 4B, the current regulator module 170 functions as a state feedback decoupling (SFbD) current regulator module 170-2. As will be described in greater detail below, in accordance with the disclosed embodiments, techniques are provided for switching operational modes of the current regulator module 170, based on speed (e.g., motor speed or electrical fundamental frequency) breakpoints, to change its topology (in terms of active blocks) so that it functions as either a complex vector (CV) current regulator module 170-1 or a state feedback decoupling (SFbD) current regulator module 170-2. In other words, based on speed breakpoints, certain blocks of the current regulator module 170 can be disabled or enabled to change its topology so that it functions as either the complex vector current regulator module 170-1 or the state feedback decoupling current regulator module 170-2. In addition, as will also be described below, decoupling voltages that are applied are changed based on whether the topology of the current regulator module 170 functions as either a complex vector (CV) current regulator module 170-1 or a state feedback decoupling (SFbD) current regulator module 170-2.

FIG. 4A is a block diagram of a current regulator 170-1, such as the current regulator 170 shown in FIG. 2, configured in accordance with one embodiment. FIG. 4A will be described with continued reference to FIG. 2. The current regulator 170 is a complex vector current regulator having a d-axis regulating portion 302 and a q-axis regulating portion 304 with cross-coupling between these portions. The d-axis regulating portion 302 receives the synchronous reference frame d-axis current signal (Id) 132, and the d-axis current command (Id*) 142 and generates a d-axis current error (Iderror) 311, and the q-axis regulating portion 304 receives the synchronous reference frame q-axis current signal (Iq) 134 and the q-axis current command (Iq*) 144 and generates a q-axis current error (Nerror) 331. Each of the regulating portions 302 and 304 produces a synchronous frame commanded voltage (e.g., the synchronous reference frame d-axis voltage command signal (Vd*) 172 and a synchronous reference frame q-axis voltage command signal (Vq*) 174) as will be described below.

Block 320 applies a proportional gain (Kpd) to the d-axis current error (Iderror) 311 to scale the d-axis current error (Iderror) 311 and generate a d-axis proportional term 321, which is a scaled value of the d-axis current error (Iderror) 311 scaled by the proportional gain (Kpd). Block 314 applies an integral gain (Kid) to the d-axis current error (Iderror) 311 to scale the d-axis current error (Iderror) 311 and generate a d-axis integral term 315, which is a scaled value of the d-axis current error (Iderror) 311 scaled by the integral gain (Kid). Block 344 applies a complex gain ($\omega_e$Kppd) to the q-axis current error (Nerror) 331 to scale the q-axis current error (Nerror) 331 and generate an output 345, which is a scaled value of the q-axis current error (Nerror) 331 scaled by the complex gain ($\omega_e$Kppd). In one embodiment, the value of $\omega_e$ is the rotor flux speed in electrical rad/s. The summing block 316 combines the d-axis integral term 315 and output 345 to generate a d-axis integrator input 317. The integrator 318 integrates the d-axis integrator input 317 to generate a d-axis integration term (Itermd) 319, which is a voltage. The summing block 322 combines the d-axis proportional term 321 and the d-axis integration term (Itermd) 319 to generate the synchronous reference frame d-axis PI output signal 323. The summing block 328 combines the signal 323 and a d-axis decoupling voltage (Vdcpld) 326 to generate the synchronous reference frame d-axis voltage command signal (Vq*) 172.

Block 340 applies a proportional gain (Kpq) to the q-axis current error (Nerror) 331 to scale the q-axis current error (Nerror) 331 and generate a q-axis proportional term 341, which is a scaled value of the q-axis current error (Nerror)

331 scaled by the proportional gain (Kpq). Block 334 applies an integral gain (Kiq) to the q-axis current error (Nerror) 331 to scale the q-axis current error (Nerror) 331 and generate a q-axis integral term 335, which is another scaled value of the q-axis current error (Nerror) 331 scaled by the integral gain (Kiq). Block 324 applies a complex gain ($\omega_e$Kppq) to the d-axis current error (Iderror) 311 to scale the d-axis current error (Iderror) 311 and generate an output 325, which is a scaled value of the d-axis current error (Iderror) 311 scaled by the complex gain ($\omega_e$Kppq). The summing block 336 combines the q-axis integral term 335 and output 325 to generate a q-axis integrator input 337. The integrator 338 integrates the q-axis integrator input 337 to generate a q-axis integration term (Itermq) 339. The summing block 342 combines the q-axis proportional term 341 and the q-axis integration term (Itermq) 339 to generate a synchronous reference frame q-axis PI output signal 343. The summing block 348 combines the signal 343 and a q-axis decoupling voltage (Vdcplq) 346 to generate the synchronous reference frame q-axis voltage command signal (Vq*) 174.

As illustrated in FIG. 4B, the complex gain block 344 includes a gain term (Kppd) that can be set to zero to disable the complex gain block 344 and effectively remove it from the d-axis regulating portion 302 so that it is no longer part of the d-axis regulating portion 302. Similarly, the complex gain block 324 includes a gain term (Kppq) that can be set to zero to disable the complex gain block 324 and effectively remove it from the q-axis regulating portion 304 so that it is no longer part of the q-axis regulating portion 304. When the complex gain blocks 324, 344 are removed from the complex vector current regulator module 170-1 that is illustrated in FIG. 4A, the complex gain blocks 324, 344 have no impact on the current regulation performed by the current regulator 170, and as illustrated in FIG. 4B, the current regulator module 170-2 then functions as a state feedback decoupling current regulator module 170-2 (as opposed to functioning as a complex vector current regulator module 170-1 that is illustrated in FIG. 4A).

Depending on which mode the current regulator 170 is operating in at any particular time, the d-axis decoupling voltage (Vdcpld) 326, 329 and the q-axis decoupling voltage (Vdcplq) 346, 347 are different. For example, when the current regulator 170 functions as the SFbD current regulator module 170-2 (FIG. 4B) for an IPMSM, the d-axis decoupling voltage (Vdcpld) 329 and the q-axis decoupling voltage (Vdcplq) 347 are shown in equations (1A) and (2A) as follows:

$$Vdcpld = -\omega_e L_q I_q \quad (1A)$$

$$Vdcplq = \omega_e \lambda_{pm} + \omega_e L_d I_d \quad (2A)$$

By contrast, when the current regulator 170 functions as the CV current regulator module 170-1 (FIG. 4A) for an IPMSM, the d-axis decoupling voltage (Vdcpld) 326 and the q-axis decoupling voltage (Vdcplq) 346 are shown in equations (3A) and (4A) as follows:

$$Vdcpld = 0 \quad (3A)$$

$$Vdcplq = \omega_e \lambda_{pm} \quad (4A)$$

As another example, when the current regulator 170 is operating as the SFbD current regulator module 170-2 (FIG. 4B) for an induction machine, the d-axis decoupling voltage (Vdcpld) 329 and the q-axis decoupling voltage (Vdcplq) 347 are shown in equations (1B) and (2B) as follows:

$$Vdcpld = -\omega_e L_s \sigma I_q - \omega_r \frac{L_m}{L_r} \lambda_{dr} \quad (1B)$$

$$Vdcplq = \omega_e L_s \sigma I_d + \frac{R_r L_m}{L_r^2} \lambda_{dr} \quad (2B)$$

and when the current regulator 170 functions as the CV current regulator module 170-1 (FIG. 4A) for an induction machine, the d-axis decoupling voltage (Vdcpld) 326 and the q-axis decoupling voltage (Vdcplq) 346 are shown in equations (3) and (4) as follows:

$$Vdcpld = -\omega_r \frac{L_m}{L_r} \lambda_{dr} \quad (3B)$$

$$Vdcplq = \frac{R_r L_m}{L_r^2} \lambda_{dr} \quad (4B)$$

In equations (1B), (2B), (3B) and (4B), $R_r$ is the rotor resistance, $L_r$ is the rotor inductance, $L_m$ is the mutual inductance, $\omega_r$ is the rotor speed (electrical rad/s), We is the rotor flux speed (electrical rad/s), $L_s\sigma$ is the stator transient inductance, and $\lambda d_r$ is rotor flux (in field oriented frame).

In addition, at the instant when the current regulator 170 switches from functioning as the SFbD current regulator module 170-2 (FIG. 4B) to the CV current regulator module 170-1 (FIG. 4A), integration terms (Item) applied at the integrators 318, 338 can be re-initialized or changed as shown in (5) and (6) as follows:

$$Iterm_d = Iterm_d + V_{dcpldprevious} - V_{dcpld} \quad (5)$$

$$Iterm_q = Iterm_q + V_{dcplqprevious} - V_{dcplq} \quad (6)$$

The integration terms (Iterm) 319, 339 in equations (5) and (6) are applied at the integrators 318, 338 only at the instant switching occurs from operating as the SFbD current regulator module 170-2 (FIG. 4B) to the CV current regulator module 170-1 (FIG. 4A), or vice-versa (e.g., at the instant switching occurs from operating as the CV current regulator module 170-1 (FIG. 4A) to the SFbD current regulator module 170-2 (FIG. 4B)).

In equations (1A)-(4A), $\omega_e$ is the electrical fundamental synchronous frequency of the machine (in radians per second), $I_d$ and $I_q$ are the synchronous reference frame d-axis and q-axis current signals 132, 134, $\lambda_{pm}$ is the permanent magnet flux linkage, respectively, which are functions of the d-axis and q-axis synchronous frame stator currents, $L_d$ and $L_q$ are the d-axis and q-axis stator inductances, which are functions of the synchronous reference frame d-axis and q-axis current signals 132, 134.

In addition, it should be noted that in some embodiments, but not all embodiments, a virtual damping resistance (that will be described in greater detail below) can also be used in equations (1) through (4) to contribute to the d-axis decoupling voltage (Vdcpld) 326 and the q-axis decoupling voltage (Vdcplq) 346. For example, equations (1A), (1B), (3A) and (3B) could be modified to subtract a correction factor RdampId, and equations (2A), (2B), (4A) and (4B) could be modified to subtract a correction factor RdampIq.

Thus, as described above with reference to FIGS. 4A and 4B, the current regulator can be configured to operate in a first operational mode (as the CVCR 170-1) when the speed is greater than a first speed threshold ($\omega_2$), or can be configured to operate in a second operational mode (as the SFbD 170-2) when the speed is below a second speed threshold ($\omega_1$). When the speed is greater than a first speed threshold ($\omega_2$), the current regulator is configured to operate in the first operational mode as a CVCR 170-1 and the cross-coupling gains (Kppd, Kppq) can be set to non-zero values. In one embodiment, the values can be set as follows: Kppd=$\omega$b*Lq; Kppq=$\omega$b*Ld. Here, $L_d$ and $L_q$ are the d-axis and q-axis stator inductances, and $\omega_b$ represents the commanded bandwidth of the current regulator. When the speed is below the second speed threshold ($\omega_1$), the current regulator is configured to operate in the second operational mode as a SFbD 170-2 and the cross-coupling gains (Kppd, Kppq) can be set to zero. This allows a structure of the current regulator to be modified on-the-fly by toggling certain features. In addition to changing the values of the cross-coupling gains (Kppd, Kppq), and the decoupling voltages (Vdcpld, Vdcplq), depending on which mode the current regulator is operating in, values of the integration terms (Itermd, Itermq) 319, 339 can be re-initialized of to ensure a smooth voltage output 172, 174 during transitions between operational modes. As described above, values of the d-axis and q-axis decoupling voltages (Vdcpld, Vdcplq) 326, 346 can be varied depending on which mode the current regulator is currently operating in.

Figure 5:
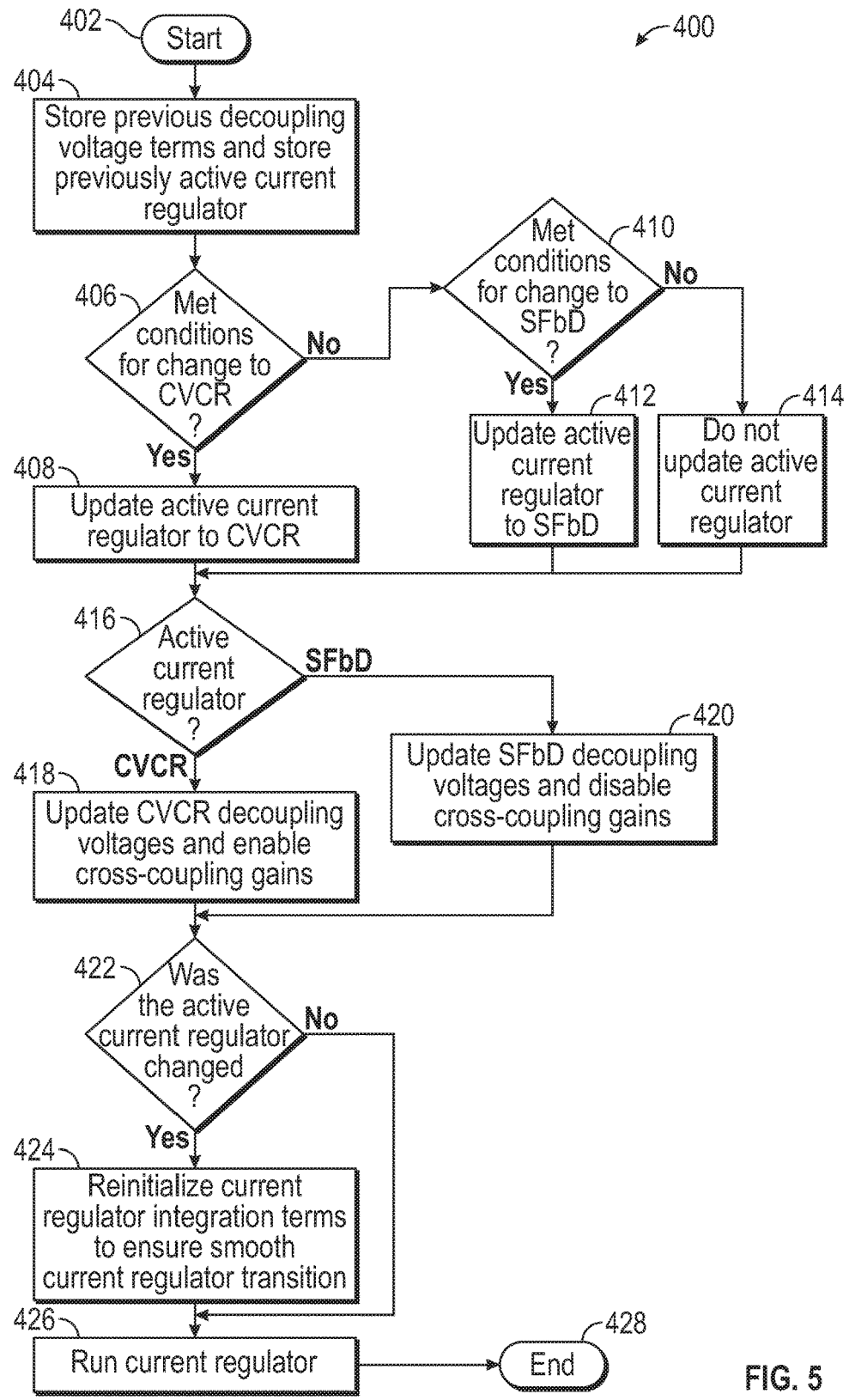
FIG. 5 is a flowchart that illustrates a control method that can be applied to at a current regulator of FIGS. 4A and 4B in accordance with the disclosed embodiments.

FIG. 5 is a flowchart that illustrates a control method 400 that can be applied to at a current regulator 170 of FIGS. 4A and 4B in accordance with various embodiments. FIG. 5 will be described with continued reference to FIGS. 1-4B. The control method 400 can be performed by a high-level controller 112 and current regulator 170 of FIG. 2 in accordance with the present disclosure. Method 400 allow an operational mode of a current regulator 170 to be configured before executing the current regulator 170 (at 426) in that operational mode. As will be explained below, the method 400 is used to determine values for the cross-coupling gains (Kppd, Kppq), and the decoupling voltages (Vdcpld, Vdcplq) 326, 346 for the next execution cycle of the current regulator 170 before it is executed in accordance with the particular operational mode that it is currently configured to operate in. Furthermore, method 400 will reinitialize the integration terms (Itermd, Itermq) 319, 339 at the instant that the operational mode of the current regulator 170 is modified. As can be appreciated in light of the disclosure, the order of operation within the method is not limited to the sequential execution as illustrated in FIG. 5, but may be performed in one or more varying orders as applicable and in accordance with the present disclosure. In various embodiments, the method 400 can be scheduled to run based on one or more predetermined events, and/or can run continuously during operation of the vehicle 1.

When the method 400 starts at 402, at 404, previous values of the decoupling voltages (Vdcpld', Vdcplq') 326', 346' are stored along with a previous operational mode (CVCR 170-1 or SFbD 170-2) that the current regulator 170 has been set to.

The method then proceeds to 406, where a determination is made regarding whether conditions have been satisfied for the current regulator 170 to operate in a first configuration (as a CVCR 170-1). In one embodiment, speed (e.g., motor speed or electrical fundamental frequency) is compared to a first speed threshold ($\omega_2$). When the speed is greater than the first speed threshold ($\omega_2$), the method 400 proceeds to 408, the current regulator 170 is placed in the first operational mode to operate in a first configuration (as a CVCR 170-1). When the speed is less than or equal to the first speed threshold ($\omega_2$), the method proceeds to 410.

At 410, a determination is made regarding whether conditions have been satisfied for the current regulator 170 to operate in a second configuration (as a SFbD 170-2). In one embodiment, speed is compared to a second speed threshold ($\omega_1$). When the speed is less than the second speed threshold ($\omega_1$), the method 400 proceeds to 412, where the current regulator 170 is placed in the second operational mode to operate in the second configuration (as a SFbD 170-2).

When the speed is greater than or equal to the second speed threshold ($\omega_1$), the method proceeds to 414, where the current regulator 170 remains in its current operational mode to operate in a current configuration (as a CVCR 170-1 or SFbD 170-2) depending on the previous operational mode (CVCR 170-1 or SFbD 170-2) that the current regulator 170 was currently set to at 404.

Following steps for 408, 412, and 414, the method 400 proceeds to 416, where the operational mode of the current regulator 170 is applied. When the operational mode of the current regulator 170 is in the first operational mode (as the CVCR 170-1), the method proceeds to 418. At 418, the cross-coupling gains (Kppd, Kppq) are enabled and the values of the decoupling voltages (Vdcpld, Vdcplq) are updated (as described above) from the previous values to configure the current regulator 170 in the first operational mode (as the CVCR 170-1).

When the operational mode of the current regulator 170 is in the second operational mode (as the SFbD 170-2), the method proceeds to 420. At 420, the cross-coupling gains (Kppd, Kppq) are disabled and the values of the decoupling voltages (Vdcpld, Vdcplq) 326, 346 are updated (as described above) from the previous values to configure the current regulator 170 in the second operational mode (as the SFbD 170-2). Thus, when operating as the SFbD current regulator module, the cross-coupling gains (Kppd, Kppq) are set to 0, and when operating as the CV current regulator module cross-coupling gains (Kppd, Kppq) are tuned accordingly to a non-zero value as described above.

After 418 and 420, the method 400 proceeds to 422 where a determination is made whether the operational mode of the current regulator 170 has changed at 416 (i.e., during this execution of method 400 the previous operational mode of the current regulator stored in 404 is not equal to the present operational mode of the current regulator set in 408 or 412). When it is determined (at 422) that the operational mode of the current regulator 170 has not changed (at 416), the method proceeds directly to 426. When it is determined (at 422) that the operational mode of the current regulator 170 has changed (at 416) this means that a transition of operational modes has occurred, and the method proceeds to 424, where integration terms (Itermd, Itermq) 319, 339 of the current regulator 170 are reinitialized at 426 (as described above) before executing a next cycle of the current regulator 170 to allow for a smooth instantaneous transition between the different operating modes.

At 426, the next execution cycle of the current regulator 170 is executed in accordance with the particular operational mode that it is currently configured to operate in and with values of the cross-coupling gains (Kppd, Kppq), the integration terms (Itermd, Itermq) 319, 339 and the decoupling voltages (Vdcpld, Vdcplq) 326, 346 set to their presently determined values for that execution cycle.

The execution cycle of the method 400 ends at 428, but it should be appreciated that this method 400 can run continuously to adjust the operational mode of the current regulator 170 based on speed, and that FIG. 5 simply shows one iteration of the method 400.

Figure 6:
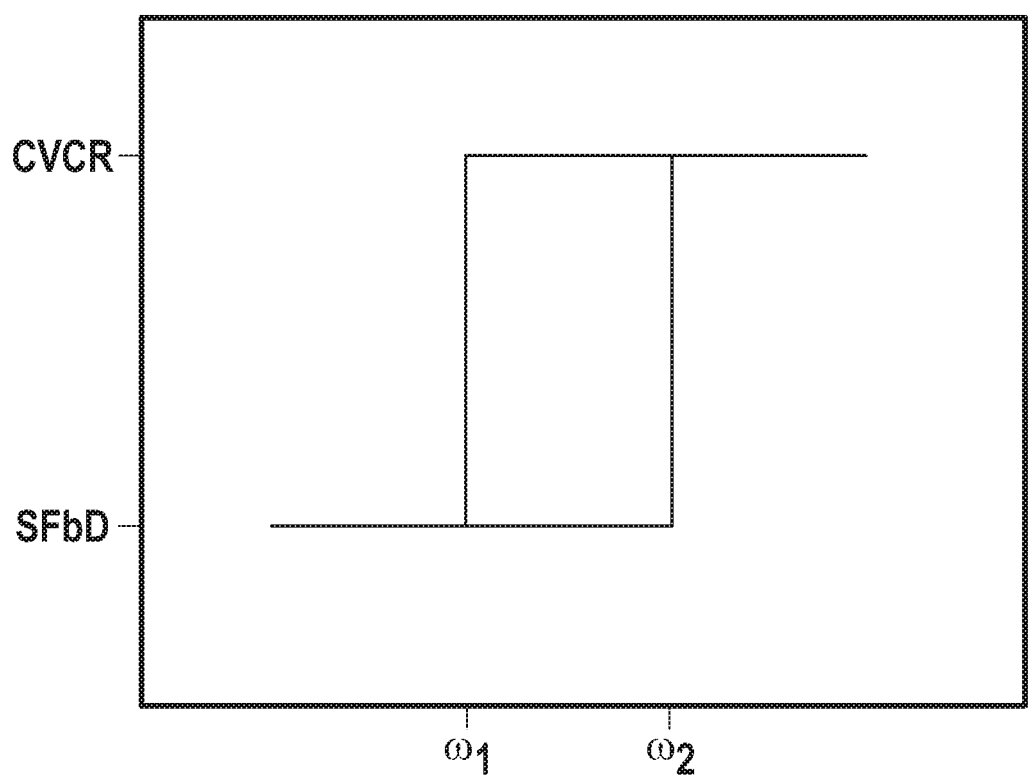
FIG. 6 is a graph that illustrates how the current regulator can be configured to operate in a first operational mode in FIG. 4A when the speed is greater than a first speed threshold ($\omega_2$), or can be configured to operate in a second operational mode shown in FIG. 4B when the speed is below a second speed threshold ($\omega_1$) in accordance with the disclosed embodiments.

FIG. 6 is a graph that illustrates how the current regulator can be configured to operate in a first operational mode (as the CVCR 170-1) when the speed is greater than or equal to a first speed threshold ($\omega_2$), or can be configured to operate in a second operational mode (as the SFbD 170-2) when the speed is less than or equal to a second speed threshold ($\omega_1$) in accordance with the disclosed embodiments. In one embodiment, the speed referenced in FIG. 6 is a fundamental electrical frequency, but in other embodiments speed could also be mechanical shaft speed. As noted above, this allows a structure of the current regulator to be modified on-the-fly by toggling certain features. In particular, FIG. 6 shows a hysteresis plot, where above first speed threshold ($\omega_2$), the CVCR will always be used, below the second speed threshold ($\omega_1$) SFbD will always be used, but between the second speed threshold ($\omega_1$) and the first speed threshold ($\omega_2$) the active current regulator will never be changed. For example, if operating in SFbD, the active current regulator configuration will not change to CVCR until a speed higher than the first speed threshold ($\omega_2$) is reached, and the active current regulator configuration will not change back to SFbD until a speed lower than the second speed threshold ($\omega_1$) is reached. This means that between the second speed threshold ($\omega_1$) and the first speed threshold ($\omega_2$), the currently active current regulator configuration will be maintained.

In addition, it is noted that the sampling frequency of the controller and switching frequency of the inverter can vary considerably during operation of an electric machine. It would be desirable to optimize the value of the virtual damping resistance that is applied at the current regulator under all operating conditions as sampling and switching frequencies vary during operation. For example, high virtual damping resistance is generally desired in AC current regulation because it can reduce current regulator parameter sensitivity and can increase current regulator dynamic stiffness thereby improving overall current regulator robustness.

To address this issue, embodiments will now be described that can allow for the value of virtual damping resistance to vary as a function of switching frequency. This allows for the highest possible value of virtual damping resistance to be utilized at the current regulator in all switching frequency operating conditions. This approach can be beneficial, for example, because increasing the value of virtual damping resistance reduces current regulator parameter sensitivity and increases current regulator dynamic stiffness thereby improving overall current regulator robustness.

In accordance with some of the disclosed embodiments, a current regulator is provided for an electric machine drive system for driving an electric machine. The current regulator includes an adjustable damping module that has a value of virtual damping resistance that is applied at the current regulator. The value of virtual damping resistance is adjustable as a function of sampling frequency. A controller can control the current regulator by determining whether the sampling frequency has changed since a previous execution cycle of the current regulator, and when the sampling frequency has changed since the previous execution cycle, the controller can modify the damping value as a function of the sampling frequency to allow the damping value to change with the sampling frequency. The damping value has a new value of virtual damping resistance that is applied at the current regulator after modifying the damping value. The controller can then execute the current regulator in accordance with the modified damping value to generate the voltage commands. Thus, in these embodiments, a virtual damping factor that is applied at the current regulator module 170 can be varied based on or changed as a function of sampling frequency.

Figure 7:
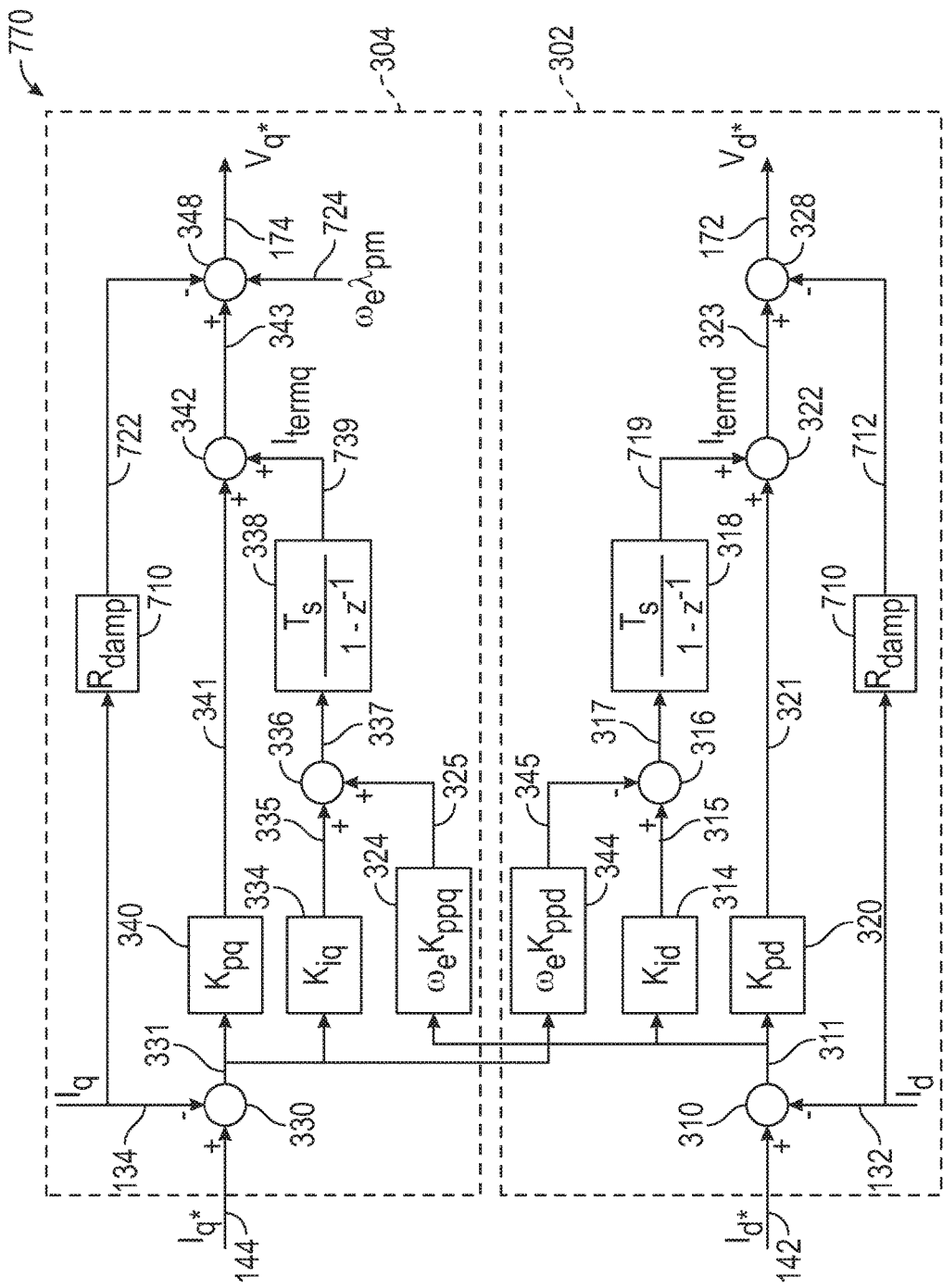
FIG. 7 is a block diagram of a current regulator in accordance with another implementation of the disclosed embodiments.

FIG. 7 is a block diagram of a current regulator 770 in accordance with another implementation of the disclosed embodiments. The current regulator 770 of FIG. 7 includes many of the same blocks as the current regulators 170-1, 170-2 of FIGS. 4A and 4B, and the descriptions of FIGS. 4A and 4B are equally applicable to FIG. 7. As such, any elements of FIGS. 4A and 4B that function the same as corresponding elements of FIG. 7 are labeled in FIG. 7 with the same reference numbers used in FIGS. 4A and 4B. Any elements of FIG. 7 that perform or operate differently than those shown in FIGS. 4A and 4B are labeled in FIG. 7 with reference numbers that begin with 7. Thus, although not illustrated in FIGS. 4A and 4B, it should be appreciated that in some embodiments, the current regulator 170 can be also include features of FIG. 7 so that it also implements a virtual damping resistance that can be modified as a function of sampling frequency ($F_s$). The sampling frequency ($F_s$) refers to the rate at which the controller samples feedback signals, performs control calculations, and updates its outputs. The sampling frequency ($F_s$) is expressed in hertz (Hz). Depending on the implementation, this sampling frequency ($F_s$) can be proportional or equal to switching frequency of the inverter module. In this regard it is noted that the sampling frequency ($F_s$) can be the same or a multiple of the switching frequency ($F_{SW}$) so that synchronization between sampling and PWM can be achieved.

In this embodiment, damping value (Rdamp) 710 is multiplied by the synchronous reference frame d-axis current signal (Id) 132 and to the synchronous reference frame q-axis current signal (Iq) 134 to generate damped current signals 712, 722. In accordance with the disclosed embodiments, the controller 112 (of FIG. 2) can vary the damping value (Rdamp) 710 based on the sampling frequency ($F_s$) whenever the sampling frequency changes. The damping value (Rdamp) 710 can be updated regularly based on sampling frequency ($F_s$).

The integrator 318 integrates the d-axis integrator input 317 to generate a d-axis integration term (Itermd) 719, and the integrator 338 integrates the q-axis integrator input 337 to generate a q-axis integration term (Itermq) 739. As the damping value transitions, the controller 112 can also reinitialize integration terms (Itermd, Itermq) 719, 739 before the current regulator 770 executes (for the present execution cycle) to help ensure smooth synchronous reference frame voltage command signals (Vd*, Vq*) 172, 174 while the damping value is being updated to the new damping value (Rdamp). Notably, applying the gains 314, 324, 334, 344 before integration process at 318, 338 allows for easier reinitialization of integration terms (Itermd, Itermq) 719, 739 so that the transition to the new damping value (Rdamp) goes smoothly and does not induce disturbances into the synchronous reference frame voltage command signals (Vd*, Vq*) 172, 174 during the transition.

In one embodiment, to reinitialize the integration terms (Itermd, Itermq) 719, 739, the controller 112 stores the previous damping value for use in further computations when it updates the new damping value (Rdamp) based on the newest sampling frequency ($F_s$). For example, in one embodiment, a change in the damping value ($\Delta$Rdamp) is calculated by subtracting the previous damping value (Rdamp') from the new damping value (Rdamp), and while the previous damping value (Rdamp') is being updated to the new damping value (Rdamp), the integration terms (Itermd, Itermq) 719, 739 of the current regulator 770 are reinitialized to ensure a smooth voltage output. The integration terms (Itermd, Itermq) 719, 739 of the current regulator 770 can be reinitialized in accordance with equations (7) and (8) as follows:

$$\text{Iterm}_d = \text{Iterm}_{d,previous} + \Delta R\text{damp } I_d \quad (7)$$

$$\text{Iterm}_q = \text{Iterm}_{q,previous} + \Delta R\text{damp } I_q \quad (8)$$

In this embodiment, the summing block 328 combines the signal 323 and the damping voltage signal 712 to generate the synchronous reference frame d-axis voltage command signal (Vq*) 172. In one embodiment, the d-axis decoupling voltage (Vdcpld) (not shown in FIG. 7) is set to zero. The summing block 348 combines the signal 343, the damping voltage signal 722, and a q-axis decoupling voltage (Vdcplq) 724 to generate the synchronous reference frame q-axis voltage command signal (Vq*) 174. In one embodiment, the q-axis decoupling voltage (Vdcplq) 724 is set to the back-EMF voltage (e.g., $\omega e \lambda_{pm}$ for a synchronous machine).

Figure 8:
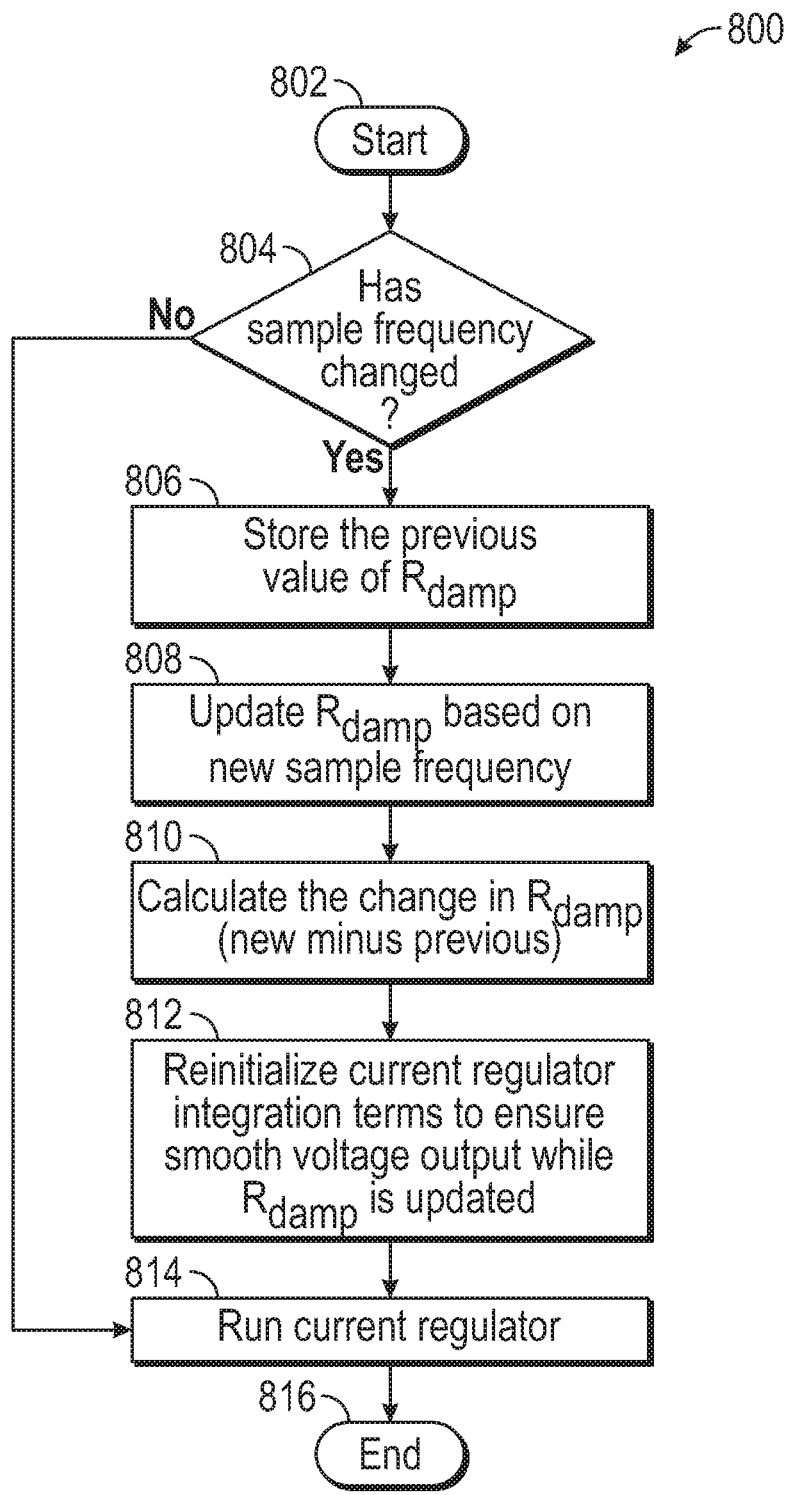
FIG. 8 is a flowchart that illustrates another control method that can be applied to at a current regulator of FIG. 7 in accordance with the disclosed embodiments.

FIG. 8 is a flowchart that illustrates a control method 800 that can be applied to at a current regulator 770 of FIG. 7 in accordance with various embodiments. In particular, FIG. 8 illustrates a method 800 for modifying a damping value (Rdamp) 710 of a current regulator 770 as a function of, for example, sampling frequency ($F_s$) and then executing the current regulator 770 in accordance with the disclosed embodiments. However, it should be appreciated that other equivalent measures of sampling frequency ($F_s$) could be utilized in conjunction with the method 800 including those described above. As will be explained below, the method 800 is used to set the damping value (Rdamp) 710 as a function of sampling frequency, and to set appropriate integration terms (Itermd, Itermq) 719, 739 for the next execution cycle of the current regulator 770 before it is executed to ensure a smooth output voltage 172, 174 during a transition period.

When the method 800 starts at 802, at 804, it is determined whether the sampling frequency ($F_s$) has changed. When it is determined (at 804) that the sampling frequency ($F_s$) has not changed, the method 800 proceeds to 814, where the current regulator 770 is executed.

When it is determined (at 804) that the sampling frequency ($F_s$) has changed, the method 800 proceeds to 806. Steps 806 through 812 are performed to update the damping value (Rdamp) 710 based on sampling frequency ($F_s$) and to reinitialize integration terms (Itermd, Itermq) 719, 739 before the current regulator 770 is executed at 814 to ensure a smooth voltage output after the damping value has been updated to the new damping value (Rdamp) that was calculated at 808.

At 806, the previous damping value is stored for use in further computations. At 808, the new damping value (Rdamp) is updated based on the present sampling frequency ($F_s$). At 810, a change in the damping value is calculated by subtracting the previous damping value (Rdamp') from the new damping value (Rdamp).

At 812, the integration terms (Itermd, Itermq) 719, 739 of the current regulator 770 are reinitialized to ensure no disturbance at the output voltage occurs when the new damping value (Rdamp) that was calculated at 808 is applied.

At 814, the next execution cycle of the current regulator 770 is executed in accordance with the updated value of the damping value (Rdamp) 710 and updated values of the integration terms (Itermd, Itermq) 719, 739 set to their presently determined values for that execution cycle. The execution cycle of the method 800 ends at 816, but it should be appreciated that this method 800 runs continuously to adjust the current regulator and that FIG. 8 simply shows one iteration of the method 800.

Figure 9:
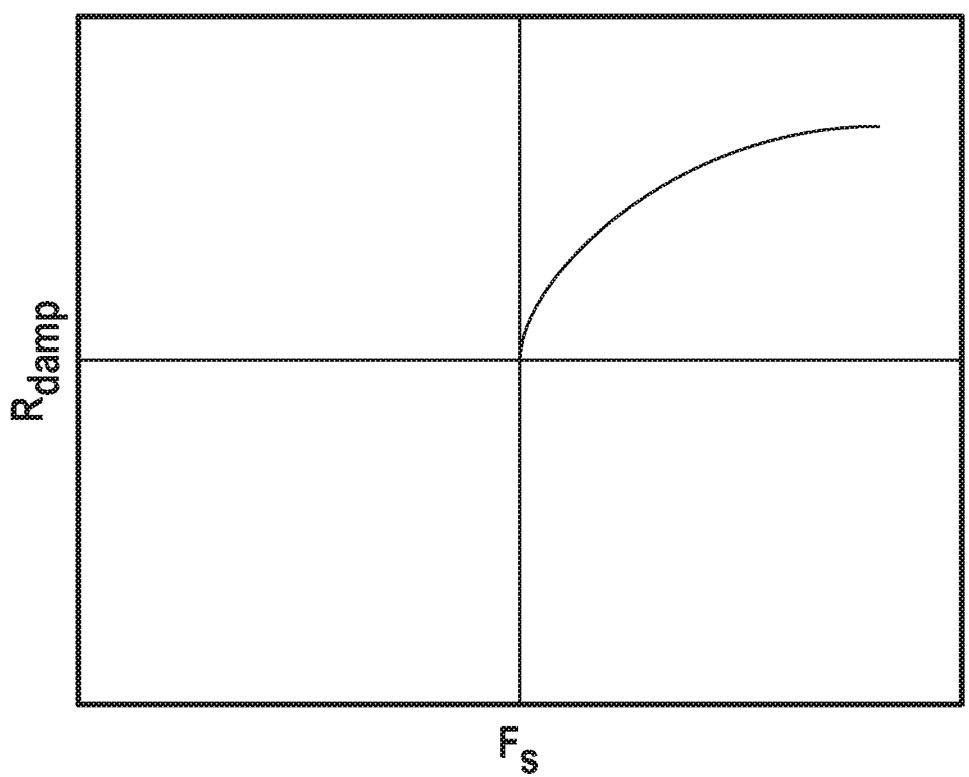
FIG. 9 is a graph that illustrates how virtual damping resistance (Rdamp) varies as a function sampling frequency ($F_s$) in accordance with the embodiment illustrated in FIGS. 7 and 8.

FIG. 9 is graph that illustrates an example of how virtual damping resistance (Rdamp) could vary as a function sampling frequency ($F_s$) in accordance with the embodiment illustrated in FIGS. 7 and 8. As the sampling frequency ($F_s$) increases, the virtual damping resistance (Rdamp) increases, and conversely, as the sampling frequency ($F_s$) decreases, the virtual damping resistance (Rdamp) decreases.

Thus, various embodiments have been described for current regulators that can be used for controlling operation of a multi-phase machine in a vector controlled motor drive system. The disclosed embodiments provide a current regulator 170 that can be configured to operate in a first operational mode (as the CVCR 170-1) when the speed (e.g., motor speed or electrical fundamental frequency) is greater than a first speed threshold ($\omega_2$), or can be configured to operate in a second operational mode (as the SFbD 170-2) when the speed is greater than a second speed threshold ($\omega_1$). This allows a structure of the current regulator to be modified on-the-fly by toggling certain features. The disclosed embodiments can also provide a mechanism for modifying a damping value (Rdamp) of a current regulator as a function of sampling frequency ($F_s$).

In other embodiments, a current regulator is provided that allows for the value of virtual damping resistance to vary as a function of switching frequency. This allows for the highest possible value of virtual damping resistance to be utilized at the current regulator in all switching frequency operating conditions. This current regulator can help optimize the value of the virtual damping resistance that is applied at the current regulator under all operating conditions as sampling and switching frequencies vary during operation. This current regulator can reduce parameter sensitivity and can increase dynamic stiffness thereby improving overall robustness of the current regulator.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a current regulator of an electric machine drive system for driving an electric machine, the method comprising:
   determining, at a controller, whether a sampling frequency has changed since a previous execution cycle of the current regulator;
   storing a previous damping value that is a previous value of the virtual damping resistance applied during the previous execution cycle of the current regulator;
   modifying, at the controller when the sampling frequency has changed since the previous execution cycle, a damping value of the current regulator as a function of sampling frequency to allow the damping value to change with the sampling frequency, wherein the damping value has a new value of virtual damping resistance that is applied at the current regulator after modifying, wherein the modifying comprises: determining the modified damping value based on the sampling frequency during a current execution cycle of the current regulator, wherein the modified damping value is a new value of virtual damping resistance based on a new sample frequency;
   computing a change in damping value based on the difference between the modified damping value and the previous damping value, wherein the change in the damping value is a change in the virtual damping resistance based on a difference between the new value of virtual damping resistance and the previous value of virtual damping resistance; and
   executing the current regulator to generate voltage commands in accordance with the modified damping value.

2. The method according to claim 1, wherein the modifying comprises:
   setting the damping value as a function of the sampling frequency.

3. The method according to claim 1, wherein the modifying comprises:
   updating the damping value based on the sampling frequency.

4. The method according to claim 1, wherein the modifying comprises:
   computing the new value of virtual damping resistance using an equation.

5. The method according to claim 1, wherein the modifying comprises:
   determining the new value of virtual damping resistance via a lookup table.

6. The method according to claim 1, further comprising:
   prior to executing the current regulator, reinitializing integration terms generated by integrators of the current regulator when the virtual damping resistance is updated.

7. The method according to claim 1, further comprising:
   prior to executing the current regulator during a current execution cycle of the current regulator, reinitializing integration terms generated by integrators of the current regulator during a transition period to avoid inducing disturbance voltages as when a previous damping value is being updated to the modified damping value.

8. The method according to claim 6, wherein executing the current regulator in accordance with the modified damping value, comprises:

executing the current regulator using the modified damping value and updated values of the integration terms generated by integrators of the current regulator by setting each to presently determined values to generate voltage commands for the current execution cycle of the current regulator.

9. The method according to claim 1, further comprising:
generating current error values, wherein each current error value is determined based on a difference between a current command value and a stator current value from the electric machine;
applying, at the current regulator, gains to the current error values prior to providing the current error values to integrators of the current regulator that generate integration terms.

10. The method according to claim 1, wherein the electric machine comprises machine terminals, the method further comprising:
generating stationary reference frame voltage command values by performing a dq-to-αβ transformation on the voltage commands;
generating phase voltage command values based on the stationary reference frame voltage command values;
generating switching vector signals based on the phase voltage command values;
generating three-phase alternating current voltage signal waveforms based on switching vector signals and a DC input voltage; and
applying the three-phase alternating current voltage signal waveforms to the machine terminals.

11. An electric machine drive system for driving an electric machine, comprising:
a current regulator configured to generate voltage command values, the current regulator comprising:
an adjustable damping module that has a value of virtual damping resistance that is applied at the current regulator, wherein the value of virtual damping resistance is adjustable as a function of sampling frequency; and
a controller that is configured to control the current regulator, the controller being configured to:
determine whether the sampling frequency has changed since a previous execution cycle of the current regulator;
store a previous damping value that is a previous value of the virtual damping resistance applied during the previous execution cycle of the current regulator;
modify, when the sampling frequency has changed since the previous execution cycle, the damping value as a function of the sampling frequency to allow the damping value to change with the sampling frequency, wherein the damping value has a new value of virtual damping resistance that is applied at the current regulator after modifying the damping value, wherein the modified damping value is determined based on the sampling frequency during a current execution cycle of the current regulator, wherein the modified damping value is a new value of virtual damping resistance based on a new sample frequency;
compute a change in damping value based on the difference between the modified damping value and the previous damping value, wherein the change in the damping value is a change in the virtual damping resistance based on a difference between the new value of virtual damping resistance and the previous value of virtual damping resistance and execute the current regulator to generate the voltage commands in accordance with the modified damping value.

12. The electric machine drive system according to claim 11, wherein the current regulator further comprises:
integrators; and
wherein the controller is further configured to:
reinitialize, prior to executing the current regulator, integration terms generated by the integrators of the current regulator based on the change in the virtual damping resistance.

13. The electric machine drive system according to claim 12, wherein the current regulator is further configured to:
generate voltage commands for the current execution cycle based on the modified damping value and updated values of integration terms generated by the integrators by setting each to presently determined values.

14. The electric machine drive system according to claim 13, wherein the current regulator is further configured to:
generate current error values, wherein each current error value is determined based on a difference between a current command value and a stator current value from the electric machine;
apply gains to the current error values prior to providing the current error values to the integrators that generate integration terms.

15. The electric machine drive system according to claim 11, further comprising:
a synchronous-to-stationary transformation module that generates stationary reference frame voltage command values by performing a dq-to-αβ transformation on the voltage command values;
an αβ-to-abc transformation module that receives the stationary reference frame voltage command values, and generates phase voltage command values;
a pulse width modulation module that generates switching vector signals based on the phase voltage command values;
an inverter module that generates three-phase alternating current voltage signal waveforms based on switching vector signals and a DC input voltage; and
an electric machine comprising machine terminals, wherein the electric machine is coupled to the inverter module and the three-phase alternating current voltage signal waveforms are applied to the machine terminals.

16. A vehicle comprising a multi-phase electric machine having machine terminals and an electric machine drive system, comprising:
a current regulator configured to generate voltage command values to control the multi-phase electric machine, the current regulator comprising:
an adjustable damping module that has a value of virtual damping resistance that is applied at the current regulator, wherein the value of virtual damping resistance is adjustable as a function of sampling frequency; and
a controller that is configured to control the current regulator, the controller being configured to:
determine whether the sampling frequency has changed since a previous execution cycle of the current regulator;
store a previous damping value that is a previous value of the virtual damping resistance applied during the previous execution cycle of the current regulator;

modify, when the sampling frequency has changed since the previous execution cycle, the damping value as a function of the sampling frequency to allow the damping value to change with the sampling frequency, wherein the damping value has a new value of virtual damping resistance that is applied at the current regulator after modifying the damping value, wherein the modified damping value is determined based on the sampling frequency during a current execution cycle of the current regulator, wherein the modified damping value is a new value of virtual damping resistance based on a new sample frequency;

compute a change in damping value based on the difference between the modified damping value and the previous damping value, wherein the change in the damping value is a change in the virtual damping resistance based on a difference between the new value of virtual damping resistance and the previous value of virtual damping resistance; and execute the current regulator to generate the voltage commands in accordance with the modified damping value.

17. The vehicle according to claim 16, wherein the current regulator further comprises:
   integrators; and
   wherein the controller is further configured to:
   reinitialize, prior to executing the current regulator, integration terms generated by the integrators of the current regulator based on the change in the virtual damping resistance, and
   wherein the current regulator is further configured to:
   generate current error values, wherein each current error value is determined based on a difference between a current command value and a stator current value from the electric machine;
   apply gains to the current error values prior to providing the current error values to the integrators that generate integration terms.

* * * * *